Oct. 24, 1967   A. J. VAN NOORD   3,348,425
REMOTE CONTROL REAR VIEW MIRROR
Filed May 4, 1964   2 Sheets-Sheet 1

INVENTOR.
Andrew J. Van Noord
BY
Dale Winnie
ATTORNEY

INVENTOR.
Andrew J. Van Noord
BY
Dale Winnie
ATTORNEY

United States Patent Office 3,348,425
Patented Oct. 24, 1967

3,348,425
REMOTE CONTROL REAR VIEW MIRROR
Andrew J. Van Noord, Grand Rapids, Mich., assignor to Kent Engineering, Grand Rapids, Mich., a partnership of Michigan
Filed May 4, 1964, Ser. No. 364,641
7 Claims. (Cl. 74—501)

ABSTRACT OF THE DISCLOSURE

A remote control rear view mirror including a housing, a mirror member pivotally mounted in the housing, a projection on the back of the mirror member on a line of reference through its pivotal center, and a pair of solid wire control cables extending through a side edge of the housing and connected to the projection, behind the mirror, from relatively opposite sides and normal thereto.

---

This invention relates to rear view mirrors in general and more particularly to remote control rear view mirrors.

Remote control rear view mirrors are enjoying great popularity for use on automotive vehicles. Such mirrors vary in construction, means of operation, assembly and installation. Some are on swivel-jointed members. Others include rack and pinion operators. Still others have flexible cable means for manipulating a reflective part of the mirror assembly.

The remote control rear view mirror which uses flexible control cables is one of the more popular remote control mirrors. It may be mounted almost anywhere as long as the flexible cables can be snaked through to the control means. The remote control mirrors which include two instead of three control cables are still more popular because of their increased simplicity and reduced cost.

It is an object of this invention to provide a remote control rear view mirror which is competitive in price with all presently known remote control rear view mirrors for automotive vehicles and which is much simpler in construction and includes fewer parts and less problems in assembly.

It is an object of this invention to provide a remote control mirror which makes use of only two control cables and which includes means of positive engagement between the mirror and its support while still affording universal freedom of movement for control positioning thereof.

It is an object of this invention to make use of only two control cables and to eliminate the need for any counteracting spring in combination therewith.

Another object of this invention is to provide a remote control rear view mirror which includes operative means in such compact assembly behind the reflective face thereof that a remote control mirror with an exceptionally slim-line profile is possible.

It is an object of this invention to provide a remote control rear view mirror having a ball and socket universal joint with the socket part inclusive of both frictional means and cable receptive means operative of the mirror. The latter, oriented as disclosed hereinafter, enables more positive mirror control and eliminates needless bending of the control cable means.

This invention also contemplates numerous other improvements of considerable importance in the case of manufacture, assembly and installation as regards remote control rear view mirrors for automotive and other uses. Such improvements and modifications will be better understood and appreciated upon a reading of the following specification in regard to a preferred embodiment of the invention and having reference to the accompanying drawings wherein.

Figure 1:
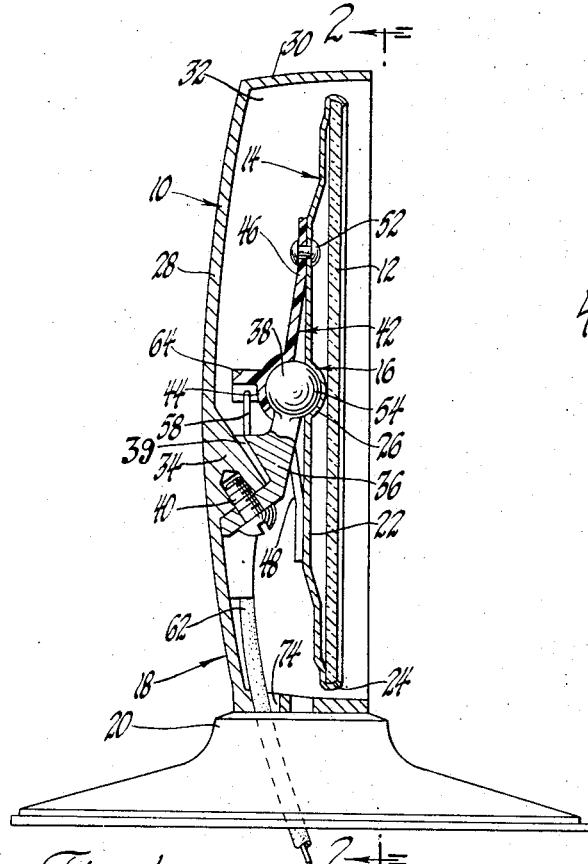
FIGURE 1 is a side profile view of a mirror including the principal features of this invention and having parts shown in cross section.

The remote control mirror of the first two drawing figures includes a reflective member 12 which has a backing member or case 14 and is mounted on a ball and socket universal joint 16 in a receptive housing or shell 18 that includes a supporting base 20. The mirror 10 is intended to be mounted on the side of a car so that the driver can see backwards and is provided with means for adjusting the viewing angle of the mirror as will subsequently be described.

The actual mirror is the reflective member 12 and it is of any of the commonly known types in which a good reflective image is obtainable.

The backing or case 14 for the mirror member 12 includes a back wall 22 which is spaced from the back of the mirror and has its edges 24 crimped or otherwise formed over the peripheral edges of the mirror to hold it thereto. The back wall 22 of the case itself is formed to include a socket seat part 26 which is part of the universal joint 16 for the mirror.

The housing or shell 18 in which the mirror member 12 is provided includes a forwardly disposed wall 28 and has an annular flange 30 provided therearound. This forms a recess 32 within which the mirror 12 is mounted and is adjustable. In the present instance, the housing or shell part 18 is fixed to the supporting base 20 and so is immovable relative thereto. However, it may be made movable and adjustable itself as will later be shown and described with respect to FIGURES 3 and 4.

Inside the hooded housing part 18, and on the front wall 28 thereof, is formed a projecting part 34. On this projection is received a member 36 which supports the mirror in the housing and includes the ball head part 38 of the universal joint 16. The member or part 36 is formed with a recess 39 on the back side thereof which fits over the projecting part 34 on the housing wall. A screw fastener 40 holds the two together.

The socket portion of the ball and socket universal joint 16 for the mirror assembly 10 includes the ball head part 38 just described, the socket seat part 26 in the mirror case 14, and a ball engaging and retaining member 42 which is fastened to the back wall of the mirror case 14. Such member has a socket seat 44 formed centrally therein and three spring finger parts 46, 48 and 50 which emanate radially outward and have their ends secured to the mirror case 14 by rivets 52 or other fastener means.

The ball engaging and retaining part 42 of the ball and socket joint 16 is preferably made of plastic and accordingly, is resistant to the normal adverse affects of exposure to weather; although its shielded protection in the housing shell 18 makes this of minor consequence. At the same time, the retaining fingers 46, 48 and 50 of the part are normally formed in the plane of the socket seat 44 so that they must be placed in tension when engaged to the back of the mirror case. This causes the ball head part 38 to be under an appreciable biasing force which requires more positive movement thereof and at the same time, guards against vibrational and wind induced fluttering thereof.

In practice, the socket seats 44 and 26 are slightly under size with respect to the ball part 38 of the joint 16. As a consequence, there is more of a line contacting engagement than a full seated engagement between the ball and socket seat parts. This also creates a stabilizing contact engagement about the pivot point 54, internally of the ball part, rather than radially inwardly thereon or axially thereof as with many universal joints.

Figure 2:
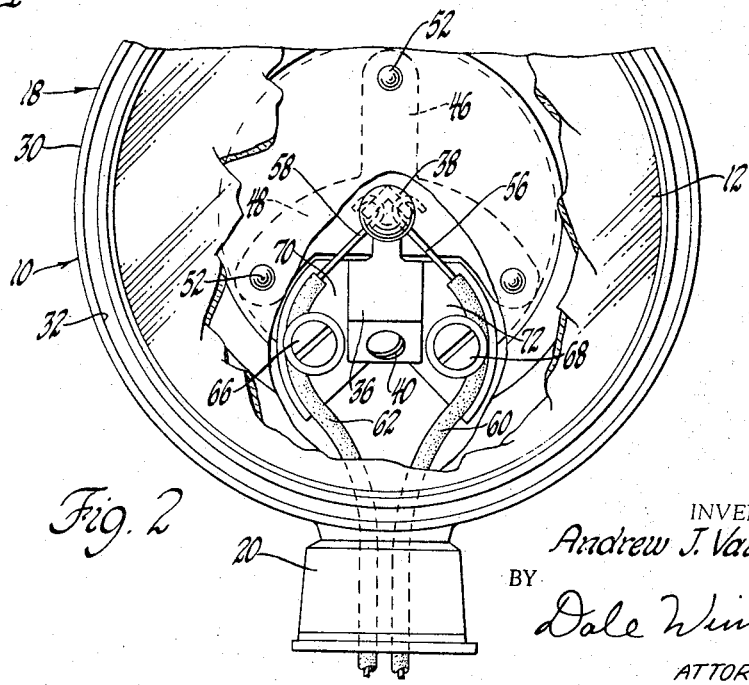
FIGURE 2 is a back face view of the mirror of FIGURE 1 with certain parts broken away to better show other parts.

Referring still to FIGURES 1 and 2, it will be noted that a pair of control wire members 58 and 56 are provided through the supporting base 20 in the housing part 18 and behind the mirror 12 and are engaged with the socket seat part 44 fastened to the back of the mirror case 14. Such control wire members are provided within protective sheaths 60 and 62 and are axially movable relative thereto. They are laterally flexible and axially stiff so that they can push or pull the mirror member to which engaged in opposite directions.

The control wires 56 and 58 are engaged to a projection 64 which is formed on the socket part 44 on the back of the retaining part 42. Figuratively, the control wire members intersect on a radial line at a spaced distance from the pivot point 54 of the universal joint 16. Actually, they are engaged to right angled parts of the projection 64 and are themselves received in engagement therewith from positions substantially at right angles to each other. The more important aspect, however, is that the control wires are connected to the back of the mirror case through leverage applying projections on a line of reference through to the pivot point 54 which enables the control wires to be disposed closely behind the mirror member and in a plane of reference parallel to it.

The two wire control means shown will be appreciated as providing a particularly compact remote control rear view mirror assembly in which no appreciable thickness in the housing part is a consequence of space needed for the control means.

The control wire members are retained in their relative right angle positions in the mirror housing 18 by means of screw fasteners 66 and 68 which are engaged in lateral extensions 70 and 72 of the member 36 and are clamped under the oversized heads provided on such fastener means.

Figure 3:
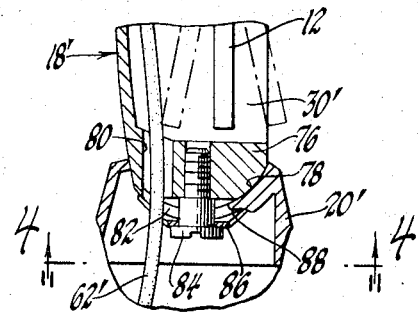
FIGURE 3 is a view of a fragmentary part of a mirror showing means of pivotally supporting the remote control mirror assembly itself.
Figure 4:
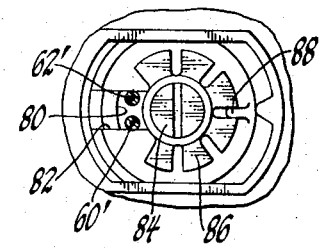
FIGURE 4 is a view of the underside of the mirror part shown by FIGURE 3 as seen in the plane of line 4—4 thereon and looking in the direction of the arrows.

In the instance of a fixed housing part 18, the control wires are simply passed through a passageway 74 in the supporting base 20. However, when an adjustable housing part 18' is used, as shown in FIGURES 3 and 4, a slightly different arrangement is involved.

An adjustable housing part 18' may be provided by having a ball joint part 76 formed on the annular flange 30' and a receptive socket 78 formed in the supporting base 20'. A passageway 80 through the housing part will allow the control wire to pass therethrough and an elongated slot 82 in the socket part 78 will suffice for essentially any adjustment required to be made.

The adjustable housing 18' is held to the receptive base part 20' by a threaded fastener 84 and a spring washer 86. It should also be noted that the spring washer 86 has the tangs thereof over the passageway 80 removed to permit passage of the control cable means therethrough. Furthermore, a depending projection 88 is provided for engagement between the tangs of the spring washer on the other side thereof to prevent its relative rotation and possible interference with the control wires.

Referring now to FIGURES 5–8, the mirror assemblies which are shown are very much the same as that shown by FIGURES 1 and 2. Accordingly, like parts are identified by like reference numerals. However, where there is some notable differernce in structure, but a basic similarity remains, a distinctive hundred unit prefix mark is used before the reference numeral.

Figure 5:
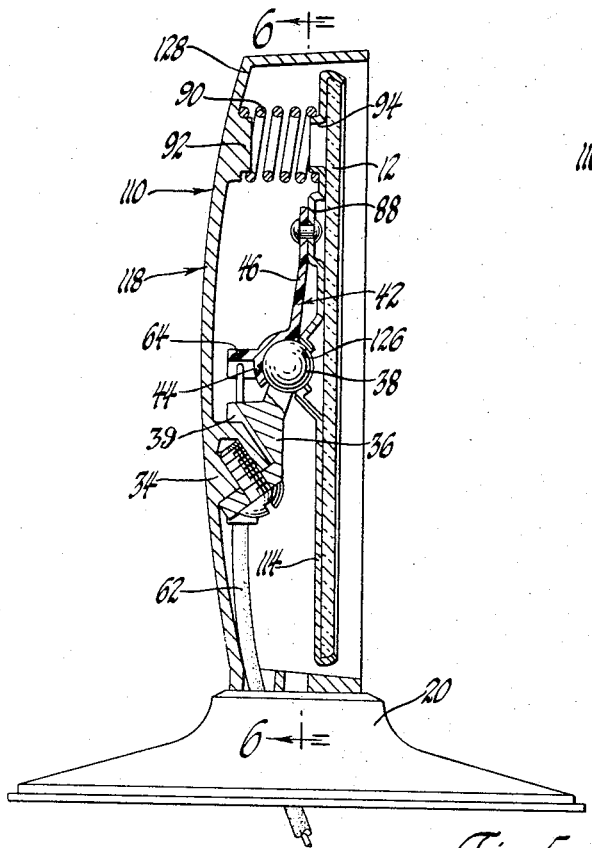
FIGURE 5 is a side view of another mirror including the remote control features of this invention and showing certain modifications.
Figure 6:
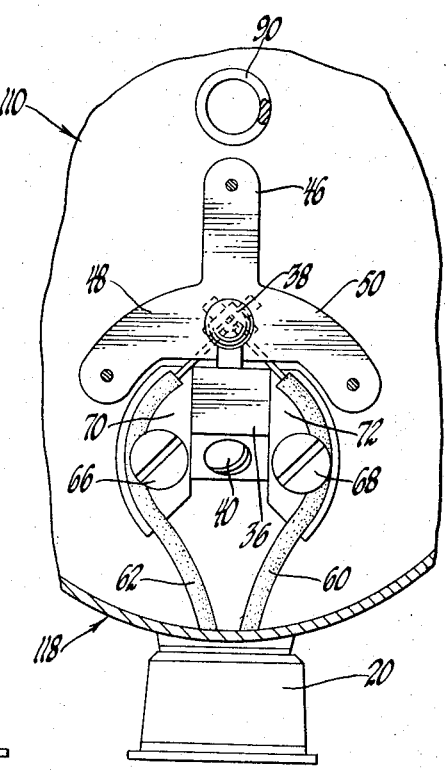
FIGURE 6 is a view of a fragmentary part of the mirror assembly of FIGURE 5 as seen in the plane of line 6—6 thereon and looking in the direction of the arrows.

In FIGURES 5 and 6, the mirror assembly 110 has the mirror case 114 formed to include an open socket seat 126. Further, the back of the case is specifically formed to include parts 88 where the spring fingers of the ball retaining part 142 are engaged thereto.

Of greatest importance is the use of a biasing spring 90 in the mirror assembly 110 and having the spring disposed between the housing wall 128 and the back of the mirror case 114. Both the housing wall and back of the mirror case are formed to include spring receptive posts or projecting parts 92 and 94 to assure retained location of the spring therebetween. It will be appreciated that the spring is a compression spring and may either assist the control means in the movement thereof in one axial direction or the cable means may be operative only in one axial direction with the spring controlling the opposite direction.

Figure 7:
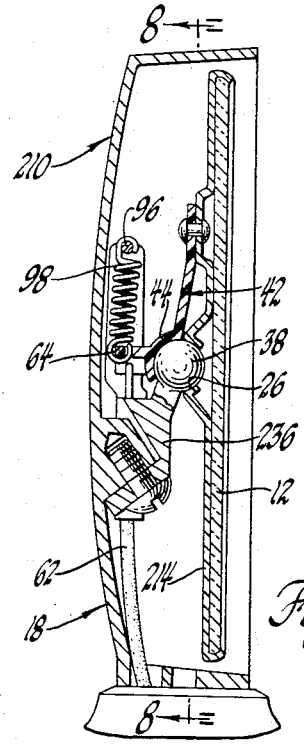
FIGURE 7 is a side view of still another mirror including the remote control features of this invention and showing certain other modifications.
Figure 8:
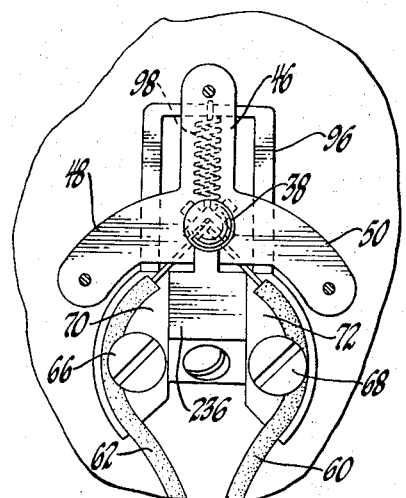
FIGURE 8 is a view of a fragmentary part of the mirror assembly of FIGURE 7 as seen in the plane of line 8—8 thereon and looking in the direction of the arrows.

FIGURES 7 and 8 show a mirror assembly 210 which has the mirror support 236 formed to include a yoke 96 and with a biasing spring 98 engaged therewith and to the projecting part 164 on the socket seat part secured to the back of the mirror case.

Essentially the same mirror biasing result is obtained as with the previous arrangement.

Although a preferred embodiment of this invention has been shown and described in detail, with certain modifications and improvements also set forth, it will be appreciated that other modifications and improvements are within the scope of the teachings set forth. Accordingly, such further improvements and modifications as are within the spirit of this invention and are not specifically excluded by the language of the hereinafter appended claims are to be considered as inclusive thereunder.

I claim:
1. A remote control rear view mirror, comprising:
   a mirror case and a mirror member receptive therein,
   means for receiving and supporting said mirror case for universal movement,
   said supporting means including a ball and socket universal joint having the socket part thereof provided on said mirror case,
   said socket part including a socket seat provided in the back wall of said mirror case and a ball part retaining member received thereover,
   said ball part retaining member being of stressable plastic material and having radial fingers emanating from the ball retaining part thereof and engaged near their terminal ends to said mirror case,
   said radial fingers being secured to said mirror case under stress for frictional and vibration resistant engagement of the ball part of said universal joint thereto,
   and a single pair of laterally flexible axial force transmitting cable members operatively connected to said socket part opposite said mirror case from the pivotal axis of said universal joint and extended relatively parallel to said mirror case for actuation thereof at a remote location apart therefrom.

2. The remote control rear view mirror of claim 1, including:
   means provided between said supporting means and said socket part for biasing said mirror case against actuation by said cable means in at least one axial direction of movement afforded thereto.

3. The remote control rear view mirror of claim 1, said supporting means including a member receptive of said mirror case within the shielded protection thereof and having means of pivotal support separate from that of said mirror case provided at a side edge thereof, and said force transmitting cable being received through the means of pivotal support for said member and in protective relation behind said mirror case as disposed within said member.

4. A remote control rear view mirror, comprising:

a mirror member having means of support including a universal joint connection engaged to the back side thereof, a rearwardly disposed projection on the back of the mirror member on a line of reference through the pivotal center of the universal joint connection and extending therebeyond, and a single pair of laterally flexible, axial force transmitting cable members disposed in a plane of reference relatively parallel to the back side of the mirror member and operatively engaged to the extended end of the projection from relatively opposite sides thereof for actuating said mirror member in the course of simultaneous axial movement of the cable members in relatively like and opposite directions.

5. The rear view mirror of claim 4, said universal joint connection including ball and socket parts providing frictional stability and having the socket part provided on the mirror member and including the rearwardly disposed projection.

6. The rear view mirror of claim 5, including:

spring means operatively engaged to said mirror member and disposed for assisting the control cables in compression in the actuation thereof.

7. The rear view mirror of claim 6, said spring means being engaged to said projection.

References Cited
UNITED STATES PATENTS

| | | | |
|---|---|---|---|
| 2,845,000 | 7/1058 | Morley | 248—475 |
| 2,962,933 | 12/1960 | Hezler | 74—501 |
| 3,030,821 | 4/1962 | Jacobson | 74—501 |
| 3,046,841 | 7/1962 | Kawecki | 74—501 |
| 3,251,238 | 5/1966 | Fuqua | 74—501 |

MILTON KAUFMAN, *Primary Examiner.*